US012794619B2

(12) United States Patent
Shahmohammadian et al.

(10) Patent No.: US 12,794,619 B2
(45) Date of Patent: Nov. 10, 2026

(54) METHOD AND APPARATUS FOR ENHANCED UPLINK TRANSMISSION FOR 8 TX OPERATION

(71) Applicant: Samsung Electronics Co., Ltd., Gyeonggi-do (KR)

(72) Inventors: Hoda Shahmohammadian, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 465 days.

(21) Appl. No.: 17/884,216

(22) Filed: Aug. 9, 2022

(65) Prior Publication Data

US 2023/0087859 A1 Mar. 23, 2023

Related U.S. Application Data

(60) Provisional application No. 63/243,471, filed on Sep. 13, 2021.

(51) Int. Cl.

*H04L 5/00* (2006.01)
*H04B 7/0456* (2017.01)
*H04W 72/23* (2023.01)

(52) U.S. Cl.

CPC ......... *H04L 5/0048* (2013.01); *H04B 7/0456* (2013.01); *H04W 72/23* (2023.01)

(58) Field of Classification Search

CPC .... H04L 5/0048; H04W 72/23; H04B 7/0456; H04B 7/0665; H04B 7/0695; H04B 7/0617

See application file for complete search history.

(56) References Cited

U.S. PATENT DOCUMENTS

| | | | |
|---|---|---|---|
| 2007/0054625 | A1 | 3/2007 | Beale |
| 2013/0035131 | A1 | 2/2013 | Scholand et al. |

(Continued)

OTHER PUBLICATIONS

Nguyen Nuu Trung, “Multiplexing Techniques for Applications Based-on 5G Systems”, Jan. 6, 2022, 27 pages.

(Continued)

*Primary Examiner* — Hassan A Phillips

*Assistant Examiner* — Sang C Lee

(74) *Attorney, Agent, or Firm* — The Farrell Law Firm, P.C.

(57) ABSTRACT

The disclosure provides an apparatus and method supporting enhanced transmission schemes of up to 8 transmission port (8 TX) uplink (UL) transmission for sounding reference signals (SRSs). A method performed by a user equipment (UE) includes receiving, from a base station, downlink control information (DCI) including a sounding reference signal (SRS) resource indicator (SRI) field; and transmitting an SRS based on an SRS resource allocated to the UE in the SRI field. The SRI field indicates a transmission rank and one or more precoding weights based on an SRS set including $N_{SRS}$ SRS resources, where $1 \leq N_{SRS} \leq 8$, and an SRI field bit length that is less than a threshold value determined from a maximum number of layers to be transmitted and the $N_{SRS}$ SRS resources.

19 Claims, 6 Drawing Sheets

(56) References Cited

U.S. PATENT DOCUMENTS

| | | | | |
|---|---|---|---|---|
| 2013/0142113 | A1 | 6/2013 | Fong et al. | |
| 2013/0195064 | A1 | 8/2013 | Yang et al. | |
| 2013/0208678 | A1 | 8/2013 | Zhang | |
| 2015/0049706 | A1 | 2/2015 | Lee et al. | |
| 2015/0288433 | A1 | 10/2015 | Onggosanusi et al. | |
| 2018/0234959 | A1* | 8/2018 | Ahn | H04W 72/20 |
| 2019/0075014 | A1* | 3/2019 | Zhou | H04W 24/02 |
| 2019/0174527 | A1* | 6/2019 | Park | H04L 5/0046 |
| 2019/0199553 | A1* | 6/2019 | Park | H04B 7/0695 |
| 2019/0207731 | A1* | 7/2019 | Park | H04B 7/0456 |
| 2020/0287602 | A1* | 9/2020 | Park | H04L 5/0007 |
| 2020/0412421 | A1* | 12/2020 | Jiang | H04B 7/0486 |
| 2021/0076391 | A1* | 3/2021 | Davydov | H04W 72/51 |
| 2021/0084640 | A1* | 3/2021 | Kang | H04L 5/0048 |
| 2021/0385668 | A1* | 12/2021 | Kang | H04W 72/046 |
| 2023/0026606 | A1* | 1/2023 | Yuan | H04B 7/0404 |

OTHER PUBLICATIONS

Taiwanese Office Action dated Aug. 18, 2025 issued in counterpart application No. 111134149, 8 pages.

* cited by examiner

METHOD AND APPARATUS FOR ENHANCED UPLINK TRANSMISSION FOR 8 TX OPERATION

CROSS-REFERENCE TO RELATED APPLICATION(S)

This application is based on and claims priority under 35 U.S.C. § 119(e) to U.S. Provisional Patent Application Ser. No. 63/243,471, which was filed in the U.S. Patent and Trademark Office on Sep. 13, 2021, the entire content of which is incorporated herein by reference.

FIELD

The disclosure relates generally to enhanced transmission schemes supporting up to 8 transmission port (8 TX) uplink (UL) transmission for sounding reference signals (SRSs).

BACKGROUND

As new radio (NR) multiple input multiple output MIMO features proceed towards commercialization, various aspects have been identified that require further enhancement. For example, in Rel-15/16/17, MIMO features were investigated and specified mostly targeting downlink operations. However, compared with downlink (DL) MIMO, there are still gaps to fill for efficient UL MIMO, in terms of coverage and capacity.

New applications, e.g., extended reality (XR) and video surveillance, are directing studies towards UL-centric or UL-heavy scenarios. Hence, it is becoming more important to identify and specify enhancements for UL MIMO, which may facilitate the use of a large antenna array, not only for frequency range 1 (FR1) (Sub 6 GHz), but also for frequency range 2 (FR2) (millimeter wave range, 24.25 to 52.6 GHz).

A proposed technical feature of UL MIMO transmission is to allow for up to 8 TX operation that targets higher UL data rate scenarios. However, to support 8 TX operation, there may be some potential impact on SRS transmission schemes and configurations, as well as a need for new codebook designs.

More specifically, in the current NR MIMO system, the $5^{th}$ generation (5G) standard specification only supports up to 4 TX UL transmission. That is, all of the transmit precoder matrix indicator (TPMI) codebook designs, SRS configurations, SRS transmission schemes, and SRS indication schemes are based on support of up to 4 TX ports for UL transmission.

Accordingly, a need also exists for enhanced TPMI codebook designs, SRS configurations, SRS transmission schemes, SRS indication schemes, etc., which are able to support up to 8 TX ports for UL transmission.

SUMMARY

Accordingly, this disclosure is provided to address at least the problems and/or disadvantages described above and to provide at least some of the advantages described below.

An aspect of the disclosure is to provide techniques and enhanced transmission schemes are provided to support up to 8 TX UL transmission for SRS signals with less overhead and complexity.

Another aspect of the disclosure is to provide new TPMI designs that allow up to eight antenna ports for UL transmission including coherency assumption.

Another aspect of the disclosure is to provide new SRS resource set configurations for 6 transmitter port-6 receiver port (6T6R), 6T8R and 8T8R antenna switching scenarios.

Another aspect of the disclosure is to provide a configuration for a larger maximum number of SRS ports for codebook based transmission.

Another aspect of the disclosure is to provide new codebook designs targeting 8 UL TX operation including coherent, non-coherent, and partial coherent precoding.

Another aspect of the disclosure is to extending the coherency definition in TPMI design targeting 8 UL TX operation.

Another aspect of the disclosure is to provide a configuration for a larger maximum number of SRS resources in one set for non-codebook based (NCB) transmission.

Another aspect of the disclosure is to provide a mechanism for group-wise indication of SRS resources in an SRS resource indicator (SRI) field of downlink control information (DCI) format 0_1.

Another aspect of the disclosure is to provide multi-stage SRS transmission schemes for NCB transmission.

Another aspect of the disclosure is to provide multi-port SRS transmission schemes for NCB transmission.

In accordance with an aspect of the disclosure, a method is provided for a user equipment (UE). The method includes receiving, from a base station, downlink control information (DCI) including a sounding reference signal (SRS) resource indicator (SRI) field; and transmitting an SRS based on an SRS resource allocated to the UE in the SRI field. The SRI field indicates a transmission rank and one or more precoding weights based on an SRS set including $N_{SRS}$ SRS resources, where $1 \leq N_{SRS} \leq 8$, and an SRI field bit length that is less than a threshold value determined from a maximum number of layers to be transmitted and the $N_{SRS}$ SRS resources.

In accordance with another aspect of the disclosure, a UE is provided, which includes a transceiver; and a processor configured to receive, from a base station, via the transceiver, downlink control information (DCI) including a sounding reference signal (SRS) resource indicator (SRI) field, and transmit, via the transceiver, an SRS based on an SRS resource allocated to the UE in the SRI field. The SRI field indicates a rank of transmission and one or more precoding weights based on an SRS set including $N_{SRS}$ SRS resources, where $1 \leq N_{SRS} \leq 8$, and an SRI field bit length that is less than a threshold value determined from a maximum number of layers to be transmitted and the $N_{SRS}$ SRS resources.

In accordance with another aspect of the disclosure, a method provided for a base station. The method includes allocating, to a user equipment (UE), a sounding reference signal (SRS) resource; transmitting, to the UE, downlink control information (DCI) including an SRS resource indicator (SRI) field; and receiving, from the UE, an SRS using the allocated SRS resource identified by the UE from the SRI field. The SRI field indicates a rank of transmission and one or more precoding weights based on an SRS set including $N_{SRS}$ SRS resources, where $1 \leq N_{SRS} \leq 8$, and an SRI field bit length that is less than a threshold value determined from a maximum number of layers to be transmitted and the $N_{SRS}$ SRS resources.

In accordance with another aspect of the disclosure, a base station is provided, which includes a transceiver; and a processor configured to allocate, to a user equipment (UE), a sounding reference signal (SRS) resource, transmit, to the UE, downlink control information (DCI) including an SRS resource indicator (SRI) field, and receive, from the UE, an SRS using the allocated SRS resource identified by the UE from the SRI field. The SRI field indicates a rank of transmission and one or more precoding weights based on an SRS set including $N_{SRS}$ SRS resources, where $1 \leq N_{SRS} \leq 8$, and an SRI field bit length that is less than a threshold value determined from a maximum number of layers to be transmitted and the $N_{SRS}$ SRS resources.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
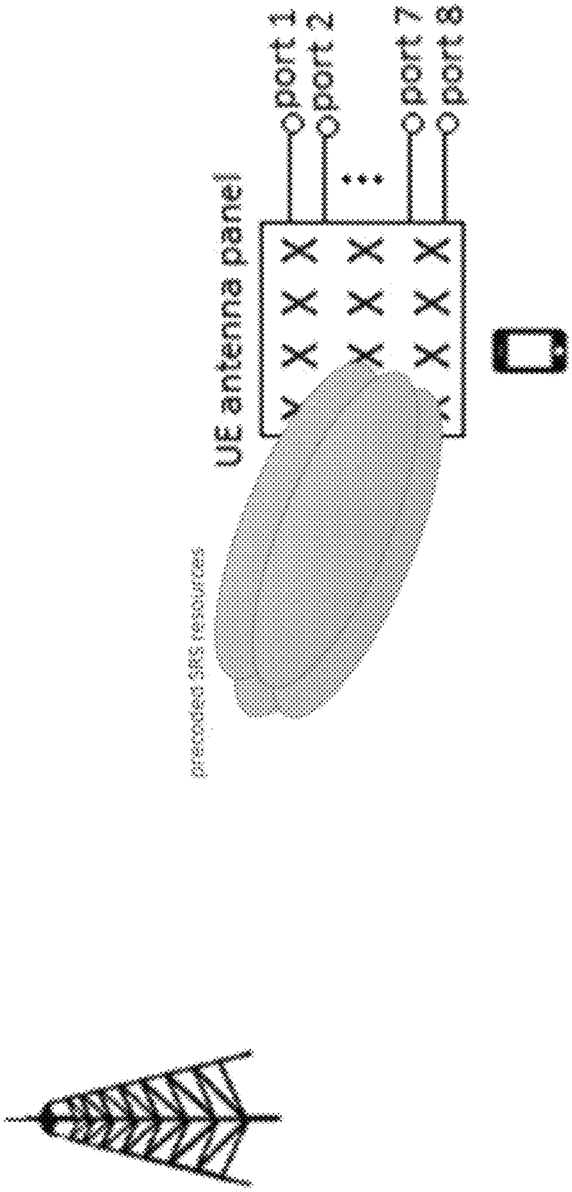
FIG. 1 illustrates an example of a configuration of a single SRS set with up to four single port SRS resources.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

As described above, a proposed technical features of UL MIMO is allowing for up to 8 TX operation, which targets UL-heavy applications. As advanced UEs (or wireless transmit/receive units ((WTRUs)), such as customer premise equipment (CPE), fixed wireless access (FWA) devices, vehicles, industrial devices, etc., become more prevalent, enhancements to support 8 antenna ports with more than 4 layers for UL transmission can offer needed improvement for UL coverage and average throughput.

As described above, a potential impact of allowing higher order MIMO is on SRS transmission schemes and configurations. In accordance with an aspect of the disclosure, techniques and enhanced transmission schemes are provided to support up to 8 TX UL transmission for SRS signals with less overhead and complexity. Also provided are new TPMI designs that allow up to eight antenna ports for UL transmission including coherency assumption.

Enhanced Uplink Transmission for 8 TX Operation

A proposed technical feature of UL MIMO is allowing higher order MIMO that targets UL-heavy applications. Supporting up to 8 Tx UL transmission provides higher UL data rate, but presents extra complexities in base station (e.g., gNodeB (gNB)) and UE implementation, and increases payload size.

Channel Sounding with Antenna Switching

A potential impact of higher order MIMO is on SRS transmission and configurations. When a UE is configured with 'antennaSwitching' in an SRS-ResourceSet, the current specification only covers configurations for supportedSRS-TxPortSwitch of xTyR, where x={1, 2, 4}. Supporting up to 8 layers of UL transmission requires a new SRS resource set configuration for 6T6R, 6T8R, and 8T8R antenna switching scenarios:

For 6T=6R, or 8T=8R, up to two SRS resource sets each with one SRS resource, where the number of SRS ports for each resource is equal to 6 or 8 respectively.

For 6T8R, up to two sets with different resourceType should be defined to cover both periodic/semi-persistent or aperiodic resource type configuration. Two resources in each set should be defined where each resource in a set is consisting of 6 SRS ports that may be the same as other resource ports. Two resources are required since there are two switching cases possible.

Codebook Based Transmission

When the UE is configured as 'codebook' in the SRS-ResourceSet, the current specification only supports configuration of a single SRS set with a maximum of two resources (i.e., one resource per non-coherent panel) and a maximum number of ports for each resource is four. Supporting up to 8 layers UL transmission, requires a configuration of a maximum number of SRS ports to 8.

Another aspect to enhance for codebook based transmission is to allow up to 8 UL transmit ports and to provide a new codebook design for those ports accordingly. In the Rel. 15 specification, each UE can have up to two panels, where each of the panels can have up to four antenna ports. However, the current specification allows up to 4 layers and up to one panel at a time for UL transmission. Allowing up to 8 layer UL transmission may be performed by allowing simultaneous UL transmission over two panels or by allowing up to eight antenna ports per panel. The former requires more specification challenges, e.g., simultaneous transmission across multiple panels may suffer from a large gap on received reference signal received powers (RSRPs) that degrades performance. Supporting either of the above-described approaches will require new precoding codebook designs corresponding to layers five to eight of UL codebook based transmission.

By allowing up to 8 antenna ports per panel, the antenna ports on each panel at the UE may be coherent or non-coherent according to the UE's ability to control the relative phase of signals transmitted over those antenna ports. Herein, the term partially coherent refers the coherency among groups of antenna ports. The antenna ports grouping for coherency can be over groups of two or four ports. In two port groups, there are four groups of antenna ports, where each can support up to rank two, and with four port groups, there are two groups of antenna ports, where each can support up to rank four.

The current specification allows UL transmission over 1, 2, or 4 antenna ports. With support of up to 8 layer UL transmission, a UE will be able to UL transmit over 1, 2, 4, or 8 antenna ports. Accordingly, new precoding matrixes are needed for this new scenario, where 8 antenna ports transmit via the uplink. A new codebook design should consider single-layer up to eight-layer UL transmission.

For non-coherent precoders, one of the antenna ports can be used for transmitting each layer. That is, each column of a precoder matrix has only one non-zero value. The number of configurable precoders for rank r of transmission is the combination of r from 8 layers (i.e., 8Cr=8!/(8−r)!r!).

Table 1 below shows non-coherent precoders for r=1 and r=2. The same approach as shown in Table 1 can be used to reach configurable non-coherent precoders of other ranks.

TABLE 1

$$r=1\quad \begin{bmatrix}1\\0\\0\\0\\0\\0\\0\\0\end{bmatrix}, \begin{bmatrix}0\\1\\0\\0\\0\\0\\0\\0\end{bmatrix}, \begin{bmatrix}0\\0\\1\\0\\0\\0\\0\\0\end{bmatrix}, \begin{bmatrix}0\\0\\0\\1\\0\\0\\0\\0\end{bmatrix}, \begin{bmatrix}0\\0\\0\\0\\1\\0\\0\\0\end{bmatrix}, \begin{bmatrix}0\\0\\0\\0\\0\\1\\0\\0\end{bmatrix}, \begin{bmatrix}0\\0\\0\\0\\0\\0\\1\\0\end{bmatrix}, \begin{bmatrix}0\\0\\0\\0\\0\\0\\0\\1\end{bmatrix}$$

TABLE 1-continued $$r = 2 \quad \begin{bmatrix} 10 \\ 01 \\ 00 \\ 00 \\ 00 \\ 00 \\ 00 \\ 00 \end{bmatrix}, \begin{bmatrix} 10 \\ 00 \\ 01 \\ 00 \\ 00 \\ 00 \\ 00 \\ 00 \end{bmatrix}, \begin{bmatrix} 10 \\ 00 \\ 00 \\ 01 \\ 00 \\ 00 \\ 00 \\ 00 \end{bmatrix}, \begin{bmatrix} 10 \\ 00 \\ 00 \\ 00 \\ 01 \\ 00 \\ 00 \\ 00 \end{bmatrix}, \begin{bmatrix} 10 \\ 00 \\ 00 \\ 00 \\ 00 \\ 01 \\ 00 \\ 00 \end{bmatrix}, \begin{bmatrix} 10 \\ 00 \\ 00 \\ 00 \\ 00 \\ 00 \\ 01 \\ 00 \end{bmatrix}, \begin{bmatrix} 10 \\ 00 \\ 00 \\ 00 \\ 00 \\ 00 \\ 00 \\ 01 \end{bmatrix}, \begin{bmatrix} 00 \\ 10 \\ 01 \\ 00 \\ 00 \\ 00 \\ 00 \\ 00 \end{bmatrix}, \begin{bmatrix} 00 \\ 10 \\ 00 \\ 01 \\ 00 \\ 00 \\ 00 \\ 00 \end{bmatrix}, \begin{bmatrix} 00 \\ 10 \\ 00 \\ 00 \\ 01 \\ 00 \\ 00 \\ 00 \end{bmatrix}, \begin{bmatrix} 00 \\ 10 \\ 00 \\ 00 \\ 00 \\ 01 \\ 00 \\ 00 \end{bmatrix}, \begin{bmatrix} 00 \\ 10 \\ 00 \\ 00 \\ 00 \\ 00 \\ 01 \\ 00 \end{bmatrix}, \begin{bmatrix} 00 \\ 10 \\ 00 \\ 00 \\ 00 \\ 00 \\ 00 \\ 01 \end{bmatrix}$$

$$\begin{bmatrix} 00 \\ 00 \\ 10 \\ 01 \\ 00 \\ 00 \\ 00 \\ 00 \end{bmatrix}, \begin{bmatrix} 00 \\ 00 \\ 10 \\ 00 \\ 01 \\ 00 \\ 00 \\ 00 \end{bmatrix}, \begin{bmatrix} 00 \\ 00 \\ 10 \\ 00 \\ 00 \\ 01 \\ 00 \\ 00 \end{bmatrix}, \begin{bmatrix} 00 \\ 00 \\ 10 \\ 00 \\ 00 \\ 00 \\ 01 \\ 00 \end{bmatrix}, \begin{bmatrix} 00 \\ 00 \\ 10 \\ 00 \\ 00 \\ 00 \\ 00 \\ 01 \end{bmatrix}, \begin{bmatrix} 00 \\ 00 \\ 00 \\ 10 \\ 01 \\ 00 \\ 00 \\ 00 \end{bmatrix}, \begin{bmatrix} 00 \\ 00 \\ 00 \\ 10 \\ 00 \\ 01 \\ 00 \\ 00 \end{bmatrix}, \begin{bmatrix} 00 \\ 00 \\ 00 \\ 10 \\ 00 \\ 00 \\ 01 \\ 00 \end{bmatrix}, \begin{bmatrix} 00 \\ 00 \\ 00 \\ 10 \\ 00 \\ 00 \\ 00 \\ 01 \end{bmatrix}, \begin{bmatrix} 00 \\ 00 \\ 00 \\ 00 \\ 10 \\ 01 \\ 00 \\ 00 \end{bmatrix}, \begin{bmatrix} 00 \\ 00 \\ 00 \\ 00 \\ 10 \\ 00 \\ 01 \\ 00 \end{bmatrix}, \begin{bmatrix} 00 \\ 00 \\ 00 \\ 00 \\ 10 \\ 00 \\ 00 \\ 01 \end{bmatrix},$$

$$\begin{bmatrix} 00 \\ 00 \\ 00 \\ 00 \\ 00 \\ 10 \\ 01 \\ 00 \end{bmatrix}, \begin{bmatrix} 00 \\ 00 \\ 00 \\ 00 \\ 00 \\ 10 \\ 00 \\ 01 \end{bmatrix}, \begin{bmatrix} 00 \\ 00 \\ 00 \\ 00 \\ 00 \\ 00 \\ 10 \\ 01 \end{bmatrix}$$

For partial-coherent precoders, considering a group of two ports, the relationship between the two antenna ports inside each group can have one of the precoders shown below in Table 2.

TABLE 2

$$\begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}$$

Using four groups of antenna ports, there would be total of 4×4=16 precoders to support single layer transmission, as shown in Table 3 below.

TABLE 3

$$r = 1 \quad \begin{bmatrix} 1 \\ 0 \\ 0 \\ 0 \\ 1 \\ 0 \\ 0 \\ 0 \end{bmatrix}, \begin{bmatrix} 1 \\ 1 \\ 0 \\ 0 \\ -1 \\ 0 \\ 0 \\ 0 \end{bmatrix}, \begin{bmatrix} 1 \\ 0 \\ 1 \\ 0 \\ j \\ 0 \\ 0 \\ 0 \end{bmatrix}, \begin{bmatrix} 1 \\ 0 \\ 0 \\ 0 \\ -j \\ 0 \\ 0 \\ 0 \end{bmatrix}, \begin{bmatrix} 0 \\ 1 \\ 0 \\ 0 \\ 0 \\ 1 \\ 0 \\ 0 \end{bmatrix}, \begin{bmatrix} 0 \\ 1 \\ 0 \\ 0 \\ 0 \\ -1 \\ 0 \\ 0 \end{bmatrix}, \begin{bmatrix} 0 \\ 1 \\ 0 \\ 0 \\ 0 \\ j \\ 0 \\ 0 \end{bmatrix}, \begin{bmatrix} 0 \\ 1 \\ 0 \\ 0 \\ 0 \\ -j \\ 0 \\ 0 \end{bmatrix}, \begin{bmatrix} 0 \\ 0 \\ 1 \\ 0 \\ 0 \\ 0 \\ 1 \\ 0 \end{bmatrix}, \begin{bmatrix} 0 \\ 0 \\ 1 \\ 0 \\ 0 \\ 0 \\ -1 \\ 0 \end{bmatrix}, \begin{bmatrix} 0 \\ 0 \\ 1 \\ 0 \\ 0 \\ 0 \\ j \\ 0 \end{bmatrix}, \begin{bmatrix} 0 \\ 0 \\ 1 \\ 0 \\ 0 \\ 0 \\ -j \\ 0 \end{bmatrix}, \begin{bmatrix} 0 \\ 0 \\ 0 \\ 1 \\ 0 \\ 0 \\ 0 \\ 1 \end{bmatrix}, \begin{bmatrix} 0 \\ 0 \\ 0 \\ 1 \\ 0 \\ 0 \\ 0 \\ -1 \end{bmatrix}, \begin{bmatrix} 0 \\ 0 \\ 0 \\ 1 \\ 0 \\ 0 \\ 0 \\ j \end{bmatrix}, \begin{bmatrix} 0 \\ 0 \\ 0 \\ 1 \\ 0 \\ 0 \\ 0 \\ -j \end{bmatrix}$$

Considering a group of four antenna ports for partial-coherency, the relationship between four antenna ports inside each group can have one of the precoders as shown in Table 4.

TABLE 4

$$\begin{bmatrix} 1 \\ 1 \\ 1 \\ 1 \end{bmatrix}, \begin{bmatrix} 1 \\ 1 \\ j \\ j \end{bmatrix}, \begin{bmatrix} 1 \\ 1 \\ -1 \\ -1 \end{bmatrix}, \begin{bmatrix} 1 \\ 1 \\ -j \\ -j \end{bmatrix}, \begin{bmatrix} 1 \\ j \\ 1 \\ j \end{bmatrix}, \begin{bmatrix} 1 \\ j \\ j \\ -1 \end{bmatrix}, \begin{bmatrix} 1 \\ j \\ -1 \\ -j \end{bmatrix}, \begin{bmatrix} 1 \\ j \\ -j \\ 1 \end{bmatrix}, \begin{bmatrix} 1 \\ -1 \\ 1 \\ -1 \end{bmatrix}, \begin{bmatrix} 1 \\ -1 \\ j \\ -j \end{bmatrix}, \begin{bmatrix} 1 \\ -1 \\ -1 \\ 1 \end{bmatrix}, \begin{bmatrix} 1 \\ -1 \\ -j \\ j \end{bmatrix}, \begin{bmatrix} 1 \\ -j \\ 1 \\ -j \end{bmatrix}, \begin{bmatrix} 1 \\ -j \\ j \\ 1 \end{bmatrix}, \begin{bmatrix} 1 \\ -j \\ -1 \\ j \end{bmatrix}, \begin{bmatrix} 1 \\ -j \\ -j \\ -1 \end{bmatrix}$$

Using two groups of antenna ports, there would be total of 16×2=32 precoders to support single layer transmission as shown in Table 5 below

TABLE 5

| r = 1 | | | | | | | | | | | | | | | | |
|---|---|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 | 1 |
| | 0 | 0 | 0 | 0 | 0 | 0 | 0 | 0 | 0 | 0 | 0 | 0 | 0 | 0 | 0 | 0 |
| | 1 | 1 | 1 | 1 | $j$ | $j$ | $j$ | $j$ | −1 | −1 | −1 | −1 | $-j$ | $-j$ | $-j$ | $-j$ |
| | 0 | 0 | 0 | 0 | 0 | 0 | 0 | 0 | 0 | 0 | 0 | 0 | 0 | 0 | 0 | 0 |
| | 1 | $j$ | −1 | $-j$ | 1 | $j$ | −1 | $-j$ | 1 | $j$ | −1 | $-j$ | 1 | $j$ | −1 | $-j$ |
| | 0 | 0 | 0 | 0 | 0 | 0 | 0 | 0 | 0 | 0 | 0 | 0 | 0 | 0 | 0 | 0 |
| | 1 | $j$ | −1 | $-j$ | $j$ | −1 | $-j$ | 1 | −1 | $-j$ | 1 | $j$ | $-j$ | 1 | $j$ | −1 |
| | 0 | 0 | 0 | 0 | 0 | 0 | 0 | 0 | 0 | 0 | 0 | 0 | 0 | 0 | 0 | 0 |

| | | | | | | | | | | | | | | | | |
|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 |
| | 1 | 1 | 1 | 1 | 1 | 1 | 1 | 1 | 1 | 1 | 1 | 1 | 1 | 1 | 1 | 1 |
| | 0 | 0 | 0 | 0 | 0 | 0 | 0 | 0 | 0 | 0 | 0 | 0 | 0 | 0 | 0 | 0 |
| | 1 | 1 | 1 | 1 | $j$ | $j$ | $j$ | $j$ | −1 | −1 | −1 | −1 | $-j$ | $-j$ | $-j$ | $-j$ |
| | 0 | 0 | 0 | 0 | 0 | 0 | 0 | 0 | 0 | 0 | 0 | 0 | 0 | 0 | 0 | 0 |
| | 1 | $j$ | −1 | $-j$ | 1 | $j$ | −1 | $-j$ | 1 | $j$ | −1 | $-j$ | 1 | $j$ | −1 | $-j$ |
| | 0 | 0 | 0 | 0 | 0 | 0 | 0 | 0 | 0 | 0 | 0 | 0 | 0 | 0 | 0 | 0 |
| | 1 | $j$ | −1 | $-j$ | $j$ | −1 | $-j$ | 1 | −1 | $-j$ | 1 | $j$ | $-j$ | 1 | $j$ | −1 |

For coherent precoders, all of the antenna ports are used for transmitting each layer. That is, each column of a precoder matrix has no zero values. For single layer transmission, such precoders are derived so that the first four ports of the column can take 16 possible weights (i.e., 16 coherent precoders of four port transmission) as shown below in Table 6.

TABLE 6

| | | | | | | | | | | | | | | | |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | $j$ | $j$ | $j$ | $j$ | −1 | −1 | −1 | −1 | $-j$ | $-j$ | $-j$ | $-j$ |
| 1 | $j$ | −1 | $-j$ | 1 | $j$ | −1 | $-j$ | 1 | $j$ | −1 | $-j$ | 1 | $j$ | −1 | $-j$ |
| 1 | $j$ | −1 | $-j$ | $j$ | −1 | $-j$ | 1 | −1 | $-j$ | 1 | $j$ | $-j$ | 1 | $j$ | −1 |

For each of the possible scenarios above, the remaining four ports of the column can similarly take 16 possible weights. That is, the number of configurable precoders for single layer transmission is 16×16=256. To illustrate, the first 16 configurable precoders are shown in Table 7 below.

TABLE 7

| | | | | | | | | | | | | | | | |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | $j$ | $j$ | $j$ | $j$ | −1 | −1 | −1 | −1 | $-j$ | $-j$ | $-j$ | $-j$ |
| 1 | $j$ | −1 | $-j$ | 1 | $j$ | −1 | $-j$ | 1 | $j$ | −1 | $-j$ | 1 | $j$ | −1 | $-j$ |
| 1 | $j$ | −1 | $-j$ | $j$ | −1 | $-j$ | 1 | −1 | $-j$ | 1 | $j$ | $-j$ | 1 | $j$ | −1 |

NCB Transmission

When the UE is configured as 'non-codebook' in the SRS-ResourceSet, the current specification only supports a configuration of a single SRS set with up to four single port SRS resources.

FIG. 1 illustrates an example of a configuration of a single SRS set with up to four single port SRS resources.

To address NCB transmission with up to 8 MIMO layers, the configurable number of SRS resources in the set (i.e., $N_{SRS}$) may be increased, e.g., up to 8 resources. Legacy NCB transmission uses the SRS resource indicator field within DCI format 0_1 to indicate physical uplink shared channel (PUSCH) precoding according to the precoding applied to specific SRS resources. A total of $$\log_2\left(\sum_{k=1}^{min(L_{max},N_{SRS})}\binom{N_{SRS}}{k}\right)$$

bits are used for the SRI field in DCI format 0_1 to select one or more SRS resources from an SRS set. The value $N_{SRS}$ corresponds to the number of SRS resources in a set and $L_{max}$ is the maximum number of layers to be transmitted. In various embodiments, the total bits may be used to determine a threshold value for selection of an SRI field bit length. For example, the equation for total bits for use in DCI format 0_1 above may be used to determine a numerical threshold value, and the SRI field bit length may be selected as a numerical value of bits less than or equal to the threshold value. Therefore, DCI overhead in terms of number of bits assigned for SRI field, with this approach (i.e., $N_{SRS}=8$ and legacy NCB) when up to 8 layer UL transmission is allowed, is as shown in Table 8.

TABLE 8

| $L_{max}$ | 1 | 2 | 3 | 4 | 5 | 6 | 7 | 8 |
|---|---|---|---|---|---|---|---|---|
| Possible cases | 8 | 36 | 92 | 162 | 218 | 246 | 254 | 255 |
| Overhead (bits) | 3 | 6 | 7 | 8 | 8 | 8 | 8 | 8 |

To address a DCI overhead increase, a new scheme is provided for SRS resource indication in an SRI field, where $N_{SRS}$ SRS resources are divided into $K_{SRS}$ groups, where group k has $M_{k,SRS}$ resources and the indication of resources in the SRI field of DCI is group-wise. This grouping can be done based on the SRS resource identifier (ID) order, where the first $M_{1,SRS}$ resources are put into the first group, the next $M_{2,SRS}$ resources are put into the second group, etc.

Figure 2:
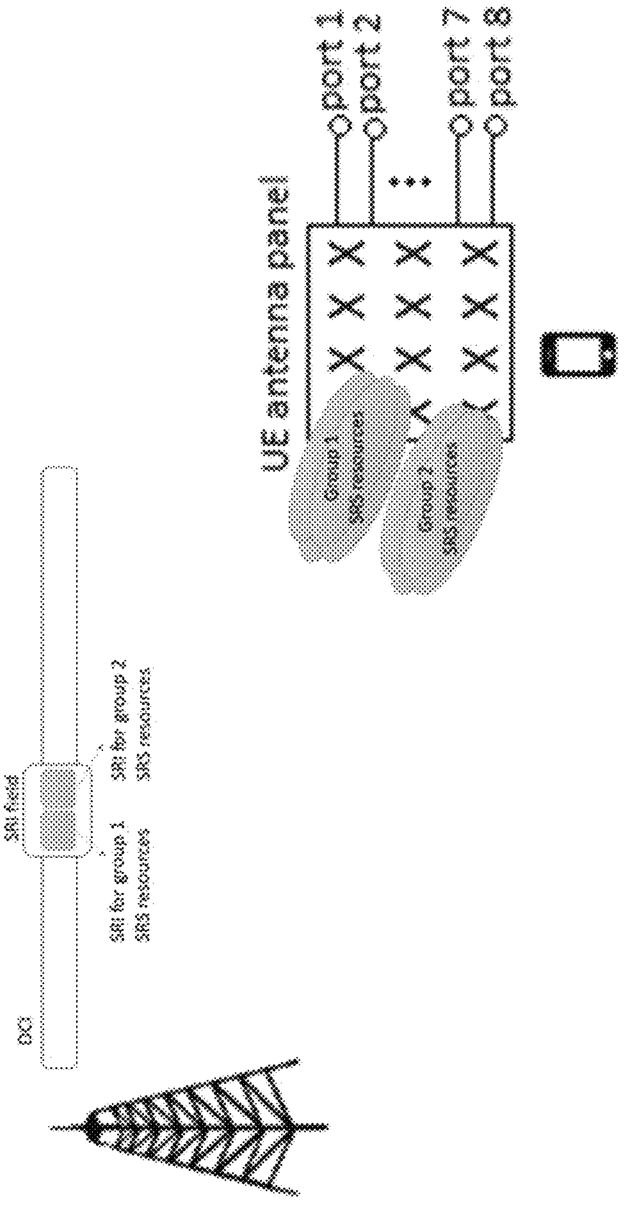
FIG. 2 illustrates an example of SRS resource indication in an SRI field, according to an embodiment.

FIG. 2 illustrates an example of SRS resource indication in an SRI field, where the SRS resources are divided into 2 SRS groups (group 1 and group 2), where group 1 has 4 resources and group 2 has 4 resources. The indication of resources in the SRI field of DCI is group-wise.

Alternatively, the grouping of resources can be done based on a predetermined ordering indicated by radio resource control (RRC) configuration or dynamically by DCI or MAC control element (CE).

Figure 3:
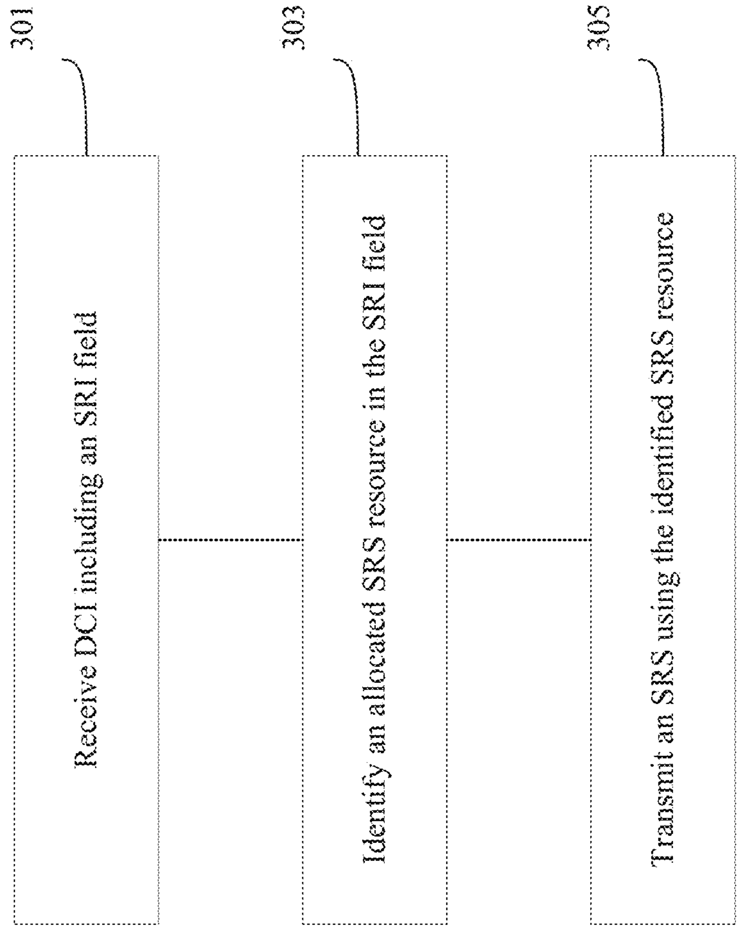
FIG. 3 is flow chart illustrating a method of transmitting an SRS, by a UE, according to an embodiment.

FIG. 3 is flow chart illustrating a method of transmitting an SRS, by a UE, according to an embodiment.

Referring to FIG. 3, in step 301, the UE receives, from a base station, DCI including an SRI field.

In step 303, the UE identifies an SRS resource allocated to the UE in the SRI field. The SRI field indicates a rank of transmission and one or more precoding weights based on an SRS set including $N_{SRS}$ SRS resources, where $1 \leq N_{SRS} \leq 8$, and/or an SRI field bit length that is less than a threshold value determined from a maximum number of layers to be transmitted and the $N_{SRS}$ SRS resources. As will be described below, the indication of the resource using the SRI field may be performed in a number of different ways.

In step 305, the UE transmits an SRS using the identified SRS resource.

Figure 4:
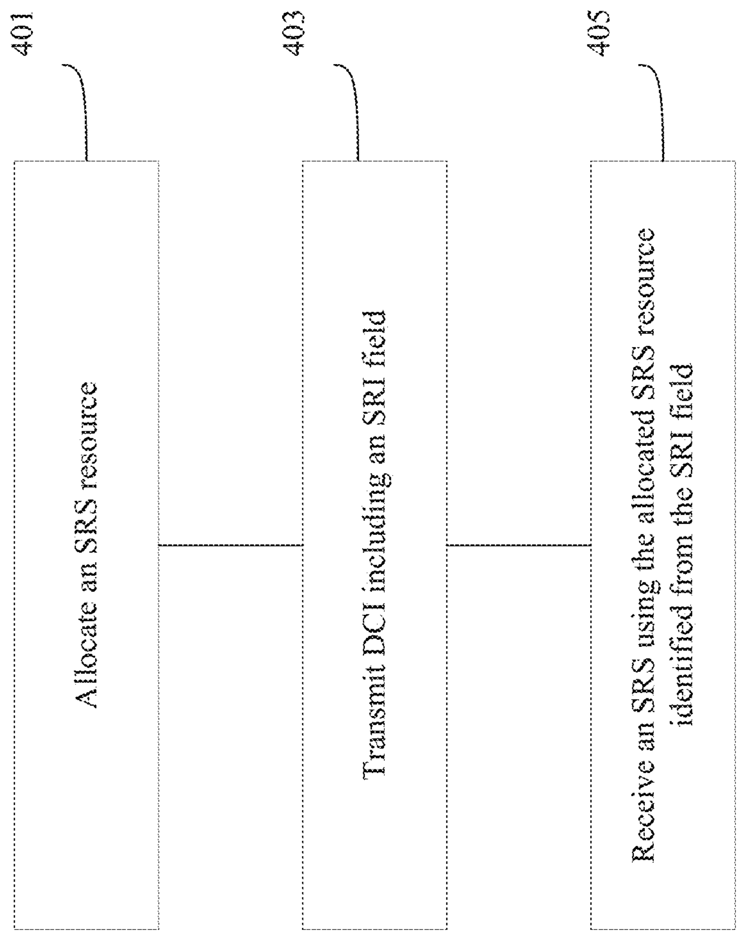
FIG. 4 is flow chart illustrating a method of receiving an SRS, by a base station, according to an embodiment.

FIG. 4 is flow chart illustrating a method of receiving an SRS, by a base station, according to an embodiment.

Referring to FIG. 4, in step 401, the base station, allocates, to a UE, an SRS resource.

In step 403, the base station transmits, to the UE, DCI including an SRI field. As described above, the SRI field indicates a rank of transmission and one or more precoding weights based on an SRS set including $N_{SRS}$ SRS resources, where $1 \leq N_{SRS} \leq 8$, and/or an SRI field bit length that is less than a threshold value determined from a maximum number of layers to be transmitted and the $N_{SRS}$ SRS resources. The indication of the resource using the SRI field may be performed in a number of different ways.

In step 405, the base station receives, from the UE, an SRS using the allocated SRS resource identified by the UE from the SRI field.

A special case is when $M_{k,SRS}=N_{SRS}/K_{SRS}$ for $k=1, \ldots, K_{SRS}$ In this case, indication of SRS resources of each group in the SRI field is then done separately in $K_{SRS}$ parts ($b_1, b_2, \ldots, b_{K_{SRS}}$), each part with up to $$b_k = \log_2\left(\sum_{l=1}^{\min(L_{k,max}, M_{k,SRS})} \binom{M_{k,SRS}}{l}\right)$$

bits for $k=1, \ldots, K_{SRS}$, where $$L_{k,max} = L_{max} - \sum_{i=1}^{k-1} r_i$$

and $r_i$ is the transmission rank of group ith of SRS resources.

An example of this scheme for SRS resource indication in the SRI field is where $N_{SRS}=8$ and the 8 SRS resources are divided into two groups of four resources, where the first four resources are put into the first group and the second four resources are put in the second group.

Indication of SRS resources of each group in SRI field performed separately in two parts ($b_1$ and $b_2$), each part with up to four bits. If $L \leq 4$, the number of bits for first part of SRI field, according to legacy approach, is $$b_1 = \log_2\left(\sum_{l=1}^{\min(L_{max},4)} \binom{4}{l}\right)$$

bits that indicate up to four resources of the first group. In this case, there is no bit allocation for the second group (i.e., $b_2=0$).

In the case of $L>4$, more than 4 bits are assigned to the SRI, where the first four bits are indicators of resources in the first group ($b_1=4$) and the fifth and later bits are used as indicators of the second group resources and are assigned according to legacy rule of $$b_2 = \log_2\left(\sum_{l=1}^{\min(L_{max},-4,4)} \binom{4}{l}\right).$$

The DCI overhead of this method is calculated as shown in Table 9.

TABLE 9

| $L_{max}$ | 1 | 2 | 3 | 4 | 5 | 6 | 7 | 8 |
|---|---|---|---|---|---|---|---|---|
| First group possible cases | 4 | 10 | 14 | 15 | 0 | 0 | 0 | 0 |
| Second group possible cases | 0 | 0 | 0 | 0 | 4 | 10 | 14 | 15 |
| First group overhead (bits) | 2 | 4 | 4 | 4 | 4 | 4 | 4 | 4 |
| Second group overhead (bits) | 0 | 0 | 0 | 0 | 2 | 4 | 4 | 4 |
| Total overhead (bits) | 2 | 4 | 4 | 4 | 6 | 8 | 8 | 8 |

As shown in Table 9, the DCI overhead of the second group is less than the first group (the legacy scheme) when $L_{max}<6$, and for other values of $L_{max}$, the overhead is the same as the legacy scheme.

Another approach for bit allocation of the SRI field in a group-wise SRS resource indication scheme is that the SRI field in the DCI has a first bit to indicate if a transmission rank is smaller than four or not. For example, if the first bit is zero then L≤4, and if the first bit is one, then L>4.

If the transmission rank is smaller than four (i.e., L≤4), then the following bits in the SRI field may be indicators of the SRS resources in the first group. In this case, a total of $$1+\log_2\left(\sum_{l=1}^{min\,(L_{max},4)}\binom{4}{l}\right)$$

bits are used in the SRI field of the DCI.

If the transmission rank is higher than four (i.e., L>4), then the first bit of the SRI field becomes an implicit indicator of all SRS resources of the first group and the following bits in the SRI field may be used to indicate the SRS resources in the second group. In this case, the total of $$1+\log_2\left(\sum_{l=1}^{min\,(L_{max}-4,4)}\binom{4}{l}\right)$$

bits are used in the SRI field of the DCI.

The DCI overhead of this method is calculated as shown in Table 10 below.

TABLE 10

| $L_{max}$ | 1 | 2 | 3 | 4 | 5 | 6 | 7 | 8 |
|---|---|---|---|---|---|---|---|---|
| Possible cases | 4 | 10 | 14 | 15 | 4 | 10 | 14 | 15 |
| Overhead (bits) (1 bit + bits for resource indication) | 3 | 5 | 5 | 5 | 3 | 5 | 5 | 5 |

As shown above in Table 10, the DCI overhead is much less than the legacy scheme.

Another approach to address NCB transmission for up to 8 layers with less resource overhead and DCI overhead is a multi-stage SRS transmission scheme. In this scheme, an NCB SRS set may be configured with SRS resources with a different number of ports.

For example, a single SRS set can configured with up to in single port SRS resources and up to $R_{SRS}$ m-port SRS resources. Each SRS resource is mapped to different antenna port(s) to cover a maximum of ($R_{SRS}$+1)m SRS antenna ports. The first stage of this scheme is similar to legacy NCB SRS transmission with m one port resources. At the kth stage of this scheme, the UE transmits k−1 m-port SRS resources precoded with precoding weights used in the last k−1 stage as well as m one port SRS resources that are precoded with a new set of precoding weights corresponding to the kth stage. The gNB has $R_{SRS}$+1 sets of received precoded SRS resources corresponding to $R_{SRS}$+1 stages of NCB SRS transmissions.

For example, when a single SRS set is configured with up to four single port SRS resources and one four-port SRS resource, at the first stage of this scheme, four one port resources are transmitted. At the second stage of this scheme, the UE transmits a four-port SRS resource precoded with precoding weights used in the first stage as well as four one port SRS resources that are precoded with a new set of precoding weights corresponding to the second four layers (i.e., layers five to eight). The gNB has two sets of received precoded SRS resources corresponding to first and second stage NCB SRS transmissions. The first received SRS set from the first stage is used by the gNB to decide on a rank and precoding of first four layers. If the rank of first stage NCB SRS transmission is decided as four by the gNB, then the second set of received precoded SRS corresponding to the second stage is used by the gNB to decide on the rank and precoding of the second four layers (i.e., layers five to eight). The gNB then uses the SRI within the DCI to feedback precoding and rank information for a PUSCH transmission. This scheme utilizes a single triggering mechanism as only one SRS resource set is configured.

Indication of SRS resources of each group in the SRI field is then done separately, in two parts ($b_1$ and $b_2$), each part with up to four bits. If L≤4, the number of bits for first part of SRI field, according to legacy approach, is $$b_1=\log_2\left(\sum_{l=1}^{min\,(L_{max},4)}\binom{4}{l}\right)$$

bits that indicate up to four resources of the first stage SRS transmission. In this case, there is no bit allocation for the second stage (i.e., $b_2$=0). If L>4, more than 4 bits are assigned to the SRI, where the first four bits are indicator of resources of the first stage ($b_1$=4) and the fifth and later bits correspond to the second stage of SRS transmission and are assigned according to legacy rule of $$b_2=\log_2\left(\sum_{l=1}^{min\,(L_{max}-4,4)}\binom{4}{l}\right).$$

The DCI overhead of this proposed two-stage scheme is calculated as shown in Table 11 below.

TABLE 11

| $L_{max}$ | 1 | 2 | 3 | 4 | 5 | 6 | 7 | 8 |
|---|---|---|---|---|---|---|---|---|
| Possible cases | 4 | 10 | 14 | 15 | 4 | 10 | 14 | 15 |
| Overhead (bits) | 2 | 4 | 4 | 4 | 6 | 8 | 8 | 8 |

As shown above, the DCI overhead is less than the legacy scheme, when $L_{max}$<6, and for other values of $L_{max}$, i.e., 6, 7, and 8, the overhead is the same as legacy scheme. However, the number of SRS resources is limited to five in the two-stage scheme, while it should be eight resources in the legacy scheme.

Another approach for bit allocation of the SRI field in a two-stage SRS transmission scheme is that the SRI field in the DCI has the first bit indicate if the transmission rank is smaller than four or not. For example, if the first bit is zero, then L≤4, and if the first bit is one, L>4.

If the transmission rank is smaller than four (i.e., L≤4), then the following bits in the SRI field are indicators of the SRS resources in the first group. In this case, a total of $$1+\log_2\left(\sum_{l=1}^{min\,(L_{max},4)}\binom{4}{l}\right)$$

bits are utilized in the SRI field of the DCI. If the transmission rank is higher than four (i.e., L>4), the first bit of the SRI field becomes an implicit indicator of all SRS resources of the first group and the following bits in the SRI field are used to indicate the SRS resources in the second group. In this case, a total of $$1+\log_2\left(\sum_{l=1}^{\min(L_{max}-4,4)}\binom{4}{l}\right)$$

bits are utilized in the SRI field of the DCI. The DCI overhead of this scheme is calculated as shown in Table 12 below.

TABLE 12

| $L_{max}$ | 1 | 2 | 3 | 4 | 5 | 6 | 7 | 8 |
|---|---|---|---|---|---|---|---|---|
| Possible cases | 4 | 10 | 14 | 15 | 4 | 10 | 14 | 15 |
| Overhead (bits) (1 bit + bits for resource indication) | 3 | 5 | 5 | 5 | 3 | 5 | 5 | 5 |

As shown above, the DCI overhead is much less than when using the legacy scheme.

To maintain backward compatibility, a two-stage SRS transmission scheme with a two-step triggering mechanism may be used. For example, the second stage of NCB SRS transmission is triggered by the gNB as required. The first step of the triggering mechanism triggers the NCB transmission of four one-port SRS resources in the set (i.e., first stage of SRS transmission) similarly to legacy NCB SRS transmission. The gNB then decides on a rank and precoding of the first stage of SRS transmission and feeds back SRIs to the UE using the DCI, and only if the decided rank is four, it also indicated to the UE to transmit the second stage of NCB SRS transmission. This second step of the triggering mechanism can be through the SRI field of the corresponding DCI of the first stage. This can be done without extra DCI overhead as the maximum possible cases for four SRS resources indication (i.e., rank four indication) is 15 in the legacy NCB scheme with up to four layer UL transmission. That is, four bits are used for the SRI field and there is one unused possible indication case. That one extra possible case can be considered as the triggering indication of the second stage of two-stage NCB transmission scheme.

When the second stage of SRS transmission of this scheme is triggered, the UE transmits a four-port SRS resource precoded with precoding weights used in the first stage as well as four one port SRS resources that are precoded with a new set of precoding weights corresponding to the second four layers (i.e., layers five to eight). The gNB then decides on the rank and precoding of the second four layers (i.e., layers five to eight) according to the received precoded SRS of this stage. The precoding and rank information for PUSCH transmission is indicated through SRI filed in a second DCI.

The DCI overhead of this scheme is calculated for the first and second stages as shown in Table 13 below.

TABLE 13

| $L_{max}$ | 1 | 2 | 3 | 4 | 5 | 6 | 7 | 8 |
|---|---|---|---|---|---|---|---|---|
| First stage possible cases | 4 | 10 | 14 | 15 | — | — | — | — |
| Second stage possible cases | — | — | — | — | 4 | 10 | 14 | 15 |
| First stage overhead (bits) | 2 | 4 | 4 | 4 | — | — | — | — |
| Second stage overhead (bits) | — | — | — | — | 2 | 4 | 4 | 4 |
| Total overhead (bits) | 2 | 4 | 4 | 4 | 6 | 8 | 8 | 8 |

As shown above, the total DCI overhead for this scheme is less than the legacy approach when $L_{max}<6$. However, since the precoding and rank of each stage is indicated separately to the UE by separate DCIs in this scheme, overhead of the corresponding DCI for each stage is limited to a maximum of four bits to be less than the legacy scheme for all values of $L_{max}$.

Multi-Port NCB Scheme

As described above, in the current specification, NCB transmission is based on configuration of a single SRS set with up to four single port SRS resources, where each of those single port SRS resources represents a layer of UL transmission.

An alternative scheme for NCB transmission can be through configuration of multi-port SRS resources instead of one port resources.

More specifically, for up to four layer UL transmission, a single SRS set can be configured with up to four multi-port SRS resources, where each multi-port SRS resource is mapped to a different group of antenna ports at the UE. Each SRS resource is yet considered to represent one layer of UL transmission at the gNB. With this method, an SRS set may be configured with SRS resources with different number of ports.

In this method, the UE can group its antenna ports based on their correlation such that each group of antennas is for one layer of UL transmission. Therefore, the UE has flexibility to apply digital precoding on each multi-port SRS resources mainly for beamforming and interference suppression purposes. The gNB may choose among up to four precoding weights (i.e., the columns of the precoding matrix) representing precoding of up to four layers of transmission, similar to the legacy NCB scheme, but not the digital precoder of each multi-port SRS. That is, the UE has some freedom to precode each SRS resource representing each layer of UL transmission individually according to the UE's observation of channel information.

This method is also applicable to eight layers of UL transmissions. That is, for up to eight layer UL transmission, a single SRS set may be configured with up to eight multi-port SRS resources, where each SRS resource is considered to represent one digitally beamformed layer of UL transmission.

Figure 5:
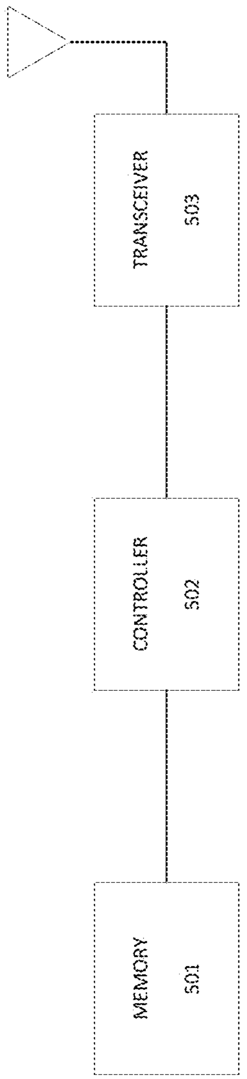
FIG. 5 illustrates a structure of a UE according to an embodiment.

FIG. 5 illustrates a structure of a UE according to an embodiment.

Referring to FIG. 5, the UE includes a transceiver 503, a controller 502, and a memory 501. The controller 502 may be a circuit, an ASIC, and/or a processor.

The transceiver 503 may transmit or receive a signal to or from another network entity. For example, the transceiver 503 may receive system information from a base station, and may also receive a synchronization signal or a reference signal from the base station.

The controller 502 may control the overall operation of the UE. For example, the controller 502 may control signal flow between blocks so as to perform operations according to the flowcharts described in the figures herein.

The memory 501 may store at least one of information transmitted or received through the transceiver 503 and information generated by the controller 502. The memory 501 may store instructions for controlling the controller 502.

Figure 6:
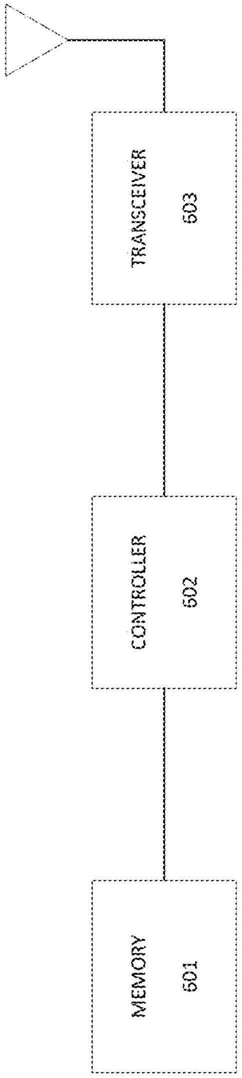
FIG. 6 illustrates a structure of a base station according to an embodiment.

FIG. 6 illustrates a structure of a base station according to an embodiment.

Referring to FIG. 6, the base station includes a transceiver 603, a controller 602, and a memory 601. The controller 602 may be a circuit, an ASIC, and/or a processor.

The transceiver 603 may transmit or receive a signal to or from another network entity. For example, the transceiver 603 may transmit system information to a UE, and may also transmit a synchronization signal or a reference signal to the UE.

The controller 602 may control the overall operation of the base station. For example, the controller 602 may control signal flow between blocks so as to perform operations according to the flowcharts described in the figures herein.

The memory 601 may store at least one of information transmitted or received through the transceiver 603 and information generated by the controller 602. The memory 601 may store instructions for controlling the controller 602.

Figure 7:
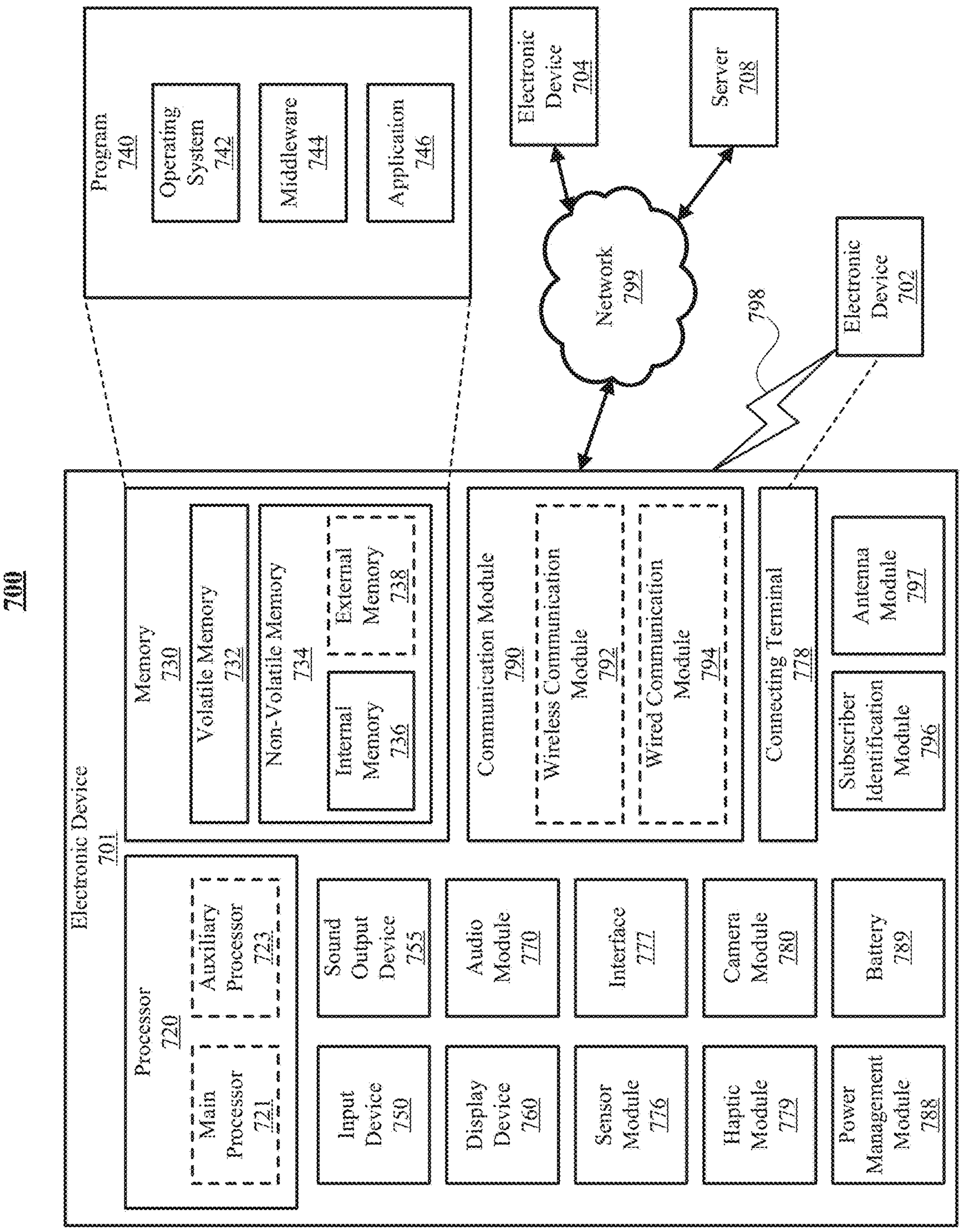
FIG. 7 illustrates an electronic device in a network environment, according to an embodiment.

FIG. 7 illustrates an electronic device in a network environment, according to an embodiment. For example, the electronic device in FIG. 7 may perform the UE operations as described above with reference to FIG. 3.

Referring to FIG. 7, the electronic device 701, e.g., a UE or mobile terminal including GPS functionality, in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797 including a GNSS antenna. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor, and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wiredly) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

In accordance with the above-described embodiments of the disclosure, a UE and method thereof provide higher UL data rate targeting UL-heavy applications, less DCI overhead for SRS resource indication, and less SRS resource overhead.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method performed by a user equipment (UE), the method comprising:

receiving, from a base station, downlink control information (DCI) including a sounding reference signal (SRS) resource indicator (SRI) field, wherein the SRI field indicates one or more SRS resources from an SRS resource set allocated to the UE; and transmitting an SRS based on an SRS resource allocated to the UE in the SRI field, wherein the SRI field indicates a transmission rank and one or more precoding weights based on:

the SRS resource set including $N_{SRS}$ SRS resources, where $1 \le N_{SRS} \le 8$, and an SRI field bit length that is less than a threshold value determined from a maximum number of layers to be transmitted and the $N_{SRS}$ SRS resources, and wherein the $N_{SRS}$ SRS resources of the SRS resource set are divided into $K_{SRS}$ groups, where group k has $M_{k,SRS}$ resources and the indication of resources in the SRI field of the DCI is group-wise.

2. The method of claim 1, wherein the threshold value determined is determined using:

$$\log_2\left(\sum_{k=1}^{min(L_{max},N_{SRS})}\binom{N_{SRS}}{k}\right),$$

where $L_{max}$ is the maximum number of layers to be transmitted.

3. The method of claim 1, wherein grouping of the $N_{SRS}$ SRS resources is performed in SRS resource identifier (ID) order.

4. The method of claim 1, wherein grouping of the $N_{SRS}$ SRS resources is performed based on a predetermined ordering indicated by a radio resource control (RRC) configuration.

5. The method of claim 1, wherein grouping of the $N_{SRS}$ SRS resources is dynamically performed based on the DCI or a MAC control element (CE).

6. The method of claim 1, wherein $N_{SRS}=8$, and wherein grouping of the $N_{SRS}$ SRS resources comprises dividing the 8 SRS resources into two groups of 4 resources, where a first four of the 8 SRS resources are put into the first group and a second four of the 8 SRS resources are put in the second group.

7. The method of claim 6, wherein the SRI field in the DCI includes a first bit that indicates if the transmission rank is smaller than four, and wherein when the first bit indicates that the transmission rank is smaller than four, following bits in the SRI field indicate the SRS resources in the first group.

8. The method of claim 7, wherein when the first bit indicates that the transmission rank is not less than four, following bits in the SRI field indicate the SRS resources in the second group.

9. The method of claim 1, wherein indication of the SRS resources of each group in the SRI field is done separately in $K_{SRS}$ parts ($b_1, b_2, \ldots, b_{K_{SRS}}$), with each part including up to $$b_k = \log_2\left(\sum_{l=1}^{min(L_{k,max},M_{k,SRS})}\binom{M_{k,SRS}}{l}\right)$$

bits for $k=1, \ldots, K_{SRS}$, wherein $M_{k,SRS}=N_{SRS}/K_{SRS}$ for $k=1, \ldots, K_{SRS}$, and wherein $$L_{k,max} = L_{max} - \sum_{i=1}^{k-1} r_i$$

and $r_i$ is the transmission rank of group ith of SRS resources.

10. The method of claim 1, wherein indication of the SRS resources of each group in the SRI field is done separately in two parts ($b_1$ and $b_2$), where each part includes up to four bits, wherein if a number of layers $L \le 4$, a first number of bits for a first part of the SRI field is $$b_1 = \log_2\left(\sum_{l=1}^{min(L_{max},4)}\binom{4}{l}\right)$$

wherein if the number of layers $L>4$, a first four bits are indicators of resources in the first part ($b_1=4$) and fifth and later bits are used as indicators of the second part and are assigned according to $$b_2 = \log_2\left(\sum_{l=1}^{min(L_{max}-4,4)}\binom{4}{l}\right),$$

where $L_{max}$ is the maximum number of layers to be transmitted.

11. The method of claim 1, wherein at least one of the $N_{SRS}$ SRS resources is mapped to a different numbers of ports.

12. The method of claim 1, wherein the $N_{SRS}$ SRS resources include m single port SRS resources or $R_{SRS}$ m-port SRS resources, and wherein each of the $N_{SRS}$ SRS resources is mapped to different antenna ports to cover a maximum of $(R_{SRS}+1)$ m SRS antenna ports.

13. The method of claim 12, wherein transmitting the SRS using the identified SRS resource comprises, at a first stage among k stages, transmitting the SRS using m one port resources.

14. The method of claim 13, wherein transmitting the SRS using the identified SRS resource further comprises, at a kth stage among the k stages, transmitting the SRS using k−1 m-port SRS resources precoded with first precoding weights used in a last k−1 stage and m one port SRS resources that are precoded with second precoding weights corresponding to the kth stage.

15. The method of claim 12, wherein transmitting the SRS using the identified SRS resource comprises, at a second stage among two stages, transmitting the SRS, in response to a trigger from the base station, using a four-port SRS resource precoded with first precoding weights used in the first stage and four one port SRS resources precoded with second precoding weights corresponding to the second stage.

16. The method of claim 15, wherein the trigger from the base station is received through an SRI field of DCI of the first stage.

17. A user equipment (UE), comprising:

a transceiver; and a processor configured to:

receive, from a base station, via the transceiver, downlink control information (DCI) including a sounding reference signal (SRS) resource indicator (SRI) field, wherein the SRI field indicates one or more SRS resources from an SRS resource set allocated to the UE, and transmit, via the transceiver, an SRS based on an SRS resource allocated to the UE in the SRI field, wherein the SRI field indicates a rank of transmission and one or more precoding weights based on:

the SRS resource set including $N_{SRS}$ SRS resources, where $1<N_{SRS}\leq 8$, and an SRI field bit length that is less than a threshold value determined from a maximum number of layers to be transmitted and the $N_{SRS}$ SRS resources, and wherein the $N_{SRS}$ SRS resources of the SRS resource set are divided into $K_{SRS}$ groups, where group k has $M_{k,SRS}$ resources and the indication of resources in the SRI field of the DCI is group-wise.

18. A method performed by a base station, the method comprising:

allocating, to a user equipment (UE), a sounding reference signal (SRS) resource;

transmitting, to the UE, downlink control information (DCI) including an SRS resource indicator (SRI) field, wherein the SRI field indicates one or more SRS resources from an SRS resource set allocated to the UE; and receiving, from the UE, an SRS using the allocated SRS resource identified by the UE from the SRI field, wherein the SRI field indicates a rank of transmission and one or more precoding weights based on:

the SRS resource set including $N_{SRS}$ SRS resources, where $1\leq N_{SRS}\leq 8$, and an SRI field bit length that is less than a threshold value determined from a maximum number of layers to be transmitted and the $N_{SRS}$ SRS resources, and wherein the $N_{SRS}$ SRS resources of the SRS resource set are divided into $K_{SRS}$ groups, where group k has $M_{k,SRS}$ sources and the indication of resources in the SRI field of the DCI is group-wise.

19. A base station, comprising:

a transceiver; and a processor configured to:

allocate, to a user equipment (UE), a sounding reference signal (SRS) resource, transmit, to the UE, downlink control information (DCI) including an SRS resource indicator (SRI) field, wherein the SRI field indicates one or more SRS resources from an SRS resource set allocated to the UE, and receive, from the UE, an SRS using the allocated SRS resource identified by the UE from the SRI field, wherein the SRI field indicates a rank of transmission and one or more precoding weights based on:

the SRS resource set including $N_{SRS}$ SRS resources, where $1\leq N_{SRS}\leq 8$, and an SRI field bit length that is less than a threshold value determined from a maximum number of layers to be transmitted and the $N_{SRS}$ SRS resources, and wherein the $N_{SRS}$ SRS resources of the SRS resource set divided into $K_{SRS}$ groups, where group k has $M_{k,SRS}$ and the indication of resources in the SRI field of the DCI is group-wise.

* * * * *